(12) United States Patent
Schröppel

(10) Patent No.: US 8,915,715 B2
(45) Date of Patent: Dec. 23, 2014

(54) WIND POWER PLANT AND METHOD FOR OPERATING THE SAME

(75) Inventor: Werner Schröppel, Wendelstein (DE)

(73) Assignee: IMO Holding GmbH, Gremsdorf (DE)

( * ) Notice: Subject to any disclaimer, the term of this patent is extended or adjusted under 35 U.S.C. 154(b) by 1033 days.

(21) Appl. No.: 12/735,792

(22) PCT Filed: Feb. 16, 2009

(86) PCT No.: PCT/EP2009/001076
§ 371 (c)(1),
(2), (4) Date: Nov. 29, 2010

(87) PCT Pub. No.: WO2009/103473
PCT Pub. Date: Aug. 27, 2009

(65) Prior Publication Data
US 2011/0115233 A1 May 19, 2011

(30) Foreign Application Priority Data

Feb. 18, 2008 (DE) .......................... 10 2008 009 740

(51) Int. Cl.
*F03D 9/00* (2006.01)
*F03D 7/02* (2006.01)
*F03D 11/00* (2006.01)
*F16C 19/38* (2006.01)

(52) U.S. Cl.
CPC ............. *F03D 7/0224* (2013.01); *Y02E 10/723* (2013.01); *F03D 7/0296* (2013.01); *F16C 2360/31* (2013.01); *F05B 2270/334* (2013.01); *F03D 11/0008* (2013.01); *F05B 2260/96* (2013.01); *F16C 2300/14* (2013.01); *Y02E 10/721* (2013.01); *F05B 2270/321* (2013.01); *F05B 2270/32* (2013.01); *F16C 19/381* (2013.01); *Y02E 10/722* (2013.01)
USPC .......................................................... 416/174

(58) Field of Classification Search
USPC .................... 416/147, 153, 204 R, 205, 174; 384/516, 548, 492
See application file for complete search history.

(56) References Cited

U.S. PATENT DOCUMENTS

2007/0297892 A1* 12/2007 Kildegaard ....................... 415/1
2008/0067815 A1* 3/2008 Suryanarayanan et al. ..... 290/44
(Continued)

FOREIGN PATENT DOCUMENTS

DE 10 2005 026 141 12/2006
NL 7305040 A * 12/1979
WO WO 2007/082532 7/2007

OTHER PUBLICATIONS

English abstract of NL 7305040.*

*Primary Examiner* — Edward Look
*Assistant Examiner* — Maxime Adjagbe
(74) *Attorney, Agent, or Firm* — Pandiscio & Pandiscio

(57) ABSTRACT

The invention is directed to a high-power wind energy installation, wherein the rotor blades, to minimize the static and/or dynamic structural load and/or to damp vibrations, for example by generating counterforces to compensate for interference forces and moments, can be adjusted even when a constant wind velocity $v_\infty$ does not warrant it, and to a method for operating such a wind energy installation; it is provided according to the invention to configure at least one rotor blade bearing therein as a rolling bearing that is optimized for a high number of inner race revolutions in that the total dynamic axial load rating $C_{a,total}$, defined according to DIN ISO 281, of all those rows (µ) of a utilized rolling bearing according to DIN ISO 281 which participate in force transmission in an axial direction is at least 1.5 times the dynamic axial load rating $C_{a,ref}$ according to DIN ISO 281 of a double-row ball slewing bearing of comparable dimensions in terms of the cross-sectional area of the bearing and the circumference centered on the centroid, and having mutually identical balls in two rows and a support angle α of 45°; and/or in that the rated life $L_{10}$, defined according to DIN ISO 281; of a utilized rolling bearing is at least 3.375 times the life $L_{10,ref}$ calculated according to DIN ISO 281, of a double-row ball slewing bearing of comparable dimensions in terms of the cross-sectional area of the bearing and the circumference centered on the centroid, and having mutually identical balls in both rows and a support angle α of 45°.

18 Claims, 4 Drawing Sheets

(56) References Cited

U.S. PATENT DOCUMENTS

| | | | |
|---|---|---|---|
| 2008/0118354 A1* | 5/2008 | Jeppesen et al. | 416/1 |
| 2008/0199315 A1 | 8/2008 | Bech | |
| 2008/0213095 A1 | 9/2008 | Bech et al. | |
| 2008/0285903 A1 | 11/2008 | Olsen | |
| 2009/0175724 A1 | 7/2009 | Russ et al. | |

* cited by examiner

WIND POWER PLANT AND METHOD FOR OPERATING THE SAME

The invention is directed to a wind power installation whose rated electrical power $P_{W.rated}$ is equal to or greater than 1.5 MW, and/or whose rotor diameter is equal to or greater than 70 m, and/or which has at least one rotor blade bearing with a pitch diameter $D_{pw}$ of 1,500 mm or above, wherein the rotor blades, to minimize the static and/or dynamic structural load and/or to damp vibrations, for example by generating counterforces to compensate for interference forces and moments, can be adjusted even when a constant wind velocity $v_\infty$ does not warrant it, and to a method for operating such an installation.

Wind power installations usually consist of a high tower topped by a nacelle that is able to rotate about a vertical axis. Inside the nacelle is a generator whose rotor is coupled to a rotor hub, which is at the front end of the nacelle and carries a plurality of approximately radially projecting rotor blades that catch the wind and, by virtue of their pitch angle, set the rotor in rotation.

Although this technology has proven itself a thousand times, there are nevertheless certain drawbacks that must be taken into account in the design. One great disadvantage is that the, for example, 80-meter-high tower naturally cannot be of completely rigid construction, but must have a structure that is able to vibrate at its own resonant frequency. These vibrations can be triggered by any number of factors, for example by wind gusts or during a storm, etc. For the tower to withstand these vibrations nondestructively it is usually extremely solidly built, which involves considerable additional expense. Nevertheless, the nacelle of such a wind power installation often swings back and forth by a meter or even more, which is in no way advantageous to the structure of the tower, which is usually of steel and/or concrete, or, for that matter, to the structure of the tower housing (the nacelle) and the rotor hub.

WO 01/77524 A1 does attempt to preclude such vibrations, insofar as possible, by whenever possible avoiding a rotation speed that corresponds to the eigen frequency of the tower. This approach has not been successful, however, since in a tower structure the eigen frequency is excited by other frequencies as well, due to the fact that the resonance peak is not a narrow cone but is relatively broad, i.e., covers a substantial frequency band.

It must also be kept in mind that the airflow to the rotor of a wind power installation is height-dependent due to friction on the ground: specifically, the velocity is lower toward the bottom of the installation, close to the ground, whereas it is higher toward the top. Thus, even in the presence of a time-invariant laminar flow, the force acting on a rotor blade that is pointing straight up is greater than the force on one that is pointing straight down.

In a wind power installation with one blade, this leads to an oscillating transverse force on the tower, and thus to a bending vibration comprised not only of a static component, but also of a periodic component with a cycle duration that is the inverse of the rotor rotation speed. In wind power installations with more than one blade, the periodic component decreases relative to the static deflection, and disappears if there is a sufficient number of blades and they completely cover the area of rotation that they pass through. For wind power installations with three blades, however, it can be demonstrated that the bending moment exerted on the tower by a laminar impinging flow that does not vary with time, said moment being approximately expressed by the following equation, depends on the rotation angle of the rotor, and thus on the rotor rotation speed:

$$M = A - B \cos(2\phi) - C \sin(b\phi) \text{ or } M = A - B \cos[(2\pi/60)2nt] - C \sin[(2\pi/60)bnt]$$

where:
M=bending moment
A, B, C=constant factors
b=number of rotor blades
φ=rotation angle of the rotor
n=rotation speed of the rotor
t=time In addition to the static deflection, the bending moment in this case has two periodic components which, at twice the frequency of the rotor, or a rotor frequency multiplied by the number of rotor blades, excite the tower of the wind power installation to bending vibrations. Because of these two periodic components, whose frequencies differ by a factor of 1.5, for example, it is virtually impossible to maneuver quickly through the resonance range of the tower structure, and the proposal put forward in WO 01/77524 A1 is therefore impracticable.

Likewise, the described bending moment causes the rotating parts to generate centrifugal forces that make themselves felt in the form of a torque about the axis of the tower. In addition, the rotor torque can also be expected to have a periodic component that applies an additional bending excitation to the tower by way of the generator and/or transmission support structures. Due to the height dependence of the wind velocity, it must therefore be expected that rotation-speed-dependent torques will occur in all three coordinate directions, together with horizontal transverse forces.

On the other hand, by varying the pitch of the rotor blade(s) as a function of rotation angle, it is possible to lessen the effect of wind gradients on the wind force and the vibrational excitation it causes, and thus to reduce the stress on components situated in the flow of force, especially the tower.

Consequently, some inventors have already proposed reducing the loads imposed on the tower of a wind power installation by such vibrations, in particular, by actively opposing them. For example, EP 1 701 034 A2 describes a method for generating a force in-phase that curbs the vibrations as a function of the pendulum oscillations of the tower of a wind power installation by pitching the rotor blades at different angles, particularly in phase opposition. DE 101 13 038 A1 has a similar disclosure content.

DE 197 39 164 A1 attempts to compensate for yawing and pitching moments by means of a closed-loop control system acting on the rotor blade adjustment system.

Both WO 01/33075 A1 and WO 2007/104306 A1 describe measures designed to compensate, insofar as possible, for asymmetrical loading of the rotor and thus of the entire support structure by different (wind) loads, by adjusting the rotor blades in a defined manner.

However, the prior inventors heretofore have not considered the fact that, in and of its mechanical behavior alone, a wind power installation is a very complex system. For example, the greater the mass at the top end of the tower, the more critical any vibrations of the supporting structure. This is because a higher mass lowers the resonance frequency of the mechanical vibrations of the tower, and lower-frequency vibrations, of course, have more energy than higher-frequency ones. The mass in the region of the nacelle and the rotor should therefore be kept as low as possible. This applies to all elements in this area, especially the rotor and all of its component, for example all the bearings, i.e., the rotor main bearing and the rotor blade bearings. Such elements thus cannot be overdimensioned arbitrarily without incurring serious disadvantages with regard to statics. The severity of this problem increases with the size of the wind power installation, i.e., if the rated electrical power $P_{w.rated}$ of the installation is equal to or greater than 1.5 MW, and/or if the rotor diameter is equal to or greater than 70 m, and/or if at least one rotor blade bearing has a pitch diameter $D_{pw}$—i.e., the diameter of the circular line running through the centers of all the bearings in one row—that is equal to or greater than 1,500 mm.

Although such "active" counter-control can reduce the vibrations of the tower by rotor blade pitch adjustment, the comparatively frequent adjustment of the rotor blades necessitated by this approach places completely different requirements on the blade bearings from those of the "passive" technology used heretofore, in which the rotor blades are adjusted only in response to changes in wind conditions.

The rotor blade bearings normally used are not equal to this type of stress and thus wear out very quickly, a problem that could not be solved heretofore. Since high costs are associated with the removal of a defective bearing, there has been no attempt to adopt the "active" closed-loop control concepts for reducing tower vibrations, which have already been worked out quite well theoretically, and reduce them to practice.

These disadvantages of the described prior art have resulted in the problem initiating the invention, that of finding a way to minimize stresses on the structure of the tower and nacelle of a wind power installation without running the risk of unacceptably high wear, or even the failure of parts vital to operation—the rotor blade bearings, for example,—within the twenty-year service life usually demanded of a wind power installation.

This problem is solved by means of a wind power installation whose rated electrical power $P_{w.rated}$ is equal to or greater than 1.5 MW, and/or whose rotor diameter is equal to or greater than 70 m, and/or that has at least one rotor blade bearing with a pitch diameter $D_{pw}$ of 1,500 mm or above, wherein the rotor blades, to minimize the static and/or dynamic structural load and/or to damp vibrations, for example by generating counterforces to compensate for interference forces and moments, can be adjusted even when a constant wind velocity $v_\infty$ does not warrant it, by virtue of the fact that used to mount the rotor blades are respective rolling bearings that are optimized for long dynamic life in that the total dynamic axial load rating $C_{a,total}$, defined according to DIN ISO 281, of all those rows (µ) of a utilized rolling bearing according to DIN ISO 281 which participate in force transmission in an axial direction is at least 1.5 times, preferably at least 1.55 times, particularly 1.6 times, the dynamic axial load rating $C_{a,ref}$ according to DIN ISO 281 of a double-row ball slewing bearing of comparable overall dimensions, calculated from the area of the rolling-bearing cross section (corrected for voids therein) times the circumference centered on the centroid, and having mutually identical balls in two rows and a support angle α of 45°:

$$C_{a,total} \geq k_1 \cdot C_{a,ref},$$

where $k_1=1.5$, preferably $k_1=1.55$, particularly $k_1=1.6$.

Corresponding to this is a calculation according to which the rated life $L_{10}$, defined according to DIN ISO 281, of a utilized rolling bearing is at least 3.375 times, preferably at least 3.75 times, particularly at least 4.0 times the life $L_{10,ref}$, calculated according to DIN ISO 281, of a double-row ball slewing bearing of comparable dimensions in terms of the cross-sectional area of the bearing and the circumference centered on the centroid, and having mutually identical balls in both rows and a support angle α of 45°:

$$L_{10} = C_{a,total}/P_a \geq k_2 \cdot L_{10,ref},$$

where $k_2=3.375$, preferably $k_2=3.75$, particularly $k_2=4.0$.

Studies have confirmed that the resulting increase in life compensates for the negative impact of the more severe stress created by frequent rolling over the most heavily stressed portions of the raceway, which are determinative of life, and the actual service life achieved is therefore sufficient for use as a rotor blade bearing.

A rotor blade bearing according to the invention constitutes a custom product that is optimized for a high number of inner race revolutions and thus, other things being equal, longer service life. The skilled person now has a clear formula for calculating a suitable rotor blade bearing for a given wind power installation, including or precisely when frequent rotor blade pitch adjustment is performed in order to minimize static and dynamic loads on the support structure. Based on the reference ball slewing bearing illustrated in cross section in FIG. 6, which can be increased or decreased in size to the desired values for $F_Q$ (area of the entire bearing-ring cross section, without voids) and $R_{F,SP}$ (radius of the centroid of the cross-sectional area) while maintaining scale, i.e., without changing the length ratios, it is possible, for each use case defined by $F_Q$ and $R_{F,SP}$, to determine a reference value for the dynamic axial load rating, which reference value is then exceeded by a factor of at least 1.5. It must be taken into account, here, that the product of $F_Q \cdot 2 \cdot \pi \cdot R_{F,SP}$ approximately corresponds to the volume V of the rotor blade bearing concerned, and thus defines a reference bearing that is comparable not only in terms of volume V, but also, roughly, in terms of mass m, and moreover has an also defined, i.e., normalized, geometry for the bearing cross section depicted in FIG. 6.

A great many factors go into every bearing design, for example the materials, type and geometry of the rolling elements and the raceways, the number of rolling elements per row and the number of rows, etc. In each case, the dynamic axial load rating can be determined on the basis of formulas stated in terms of individual predefined variables and conforming to DIN Standard 281, which formulas are also repeated for rows of balls and rows of rollers in the specific descriptive part, and can be compared to the reference value according to the invention.

A not insignificant feature is that the annular connecting elements of a rotor blade bearing according to the invention should be made of tempered steel, which has been tempered and annealed and, if appropriate, thermally post-treated.

Another feature that merits attention is that the surfaces of the raceways should be hardened, with a thickness for the hardened layer of at least approximately $\frac{1}{20}^{th}$ the diameter of the rolling element concerned. Only under these circumstances can such a bearing be relied on to achieve a long service life despite constant rotation. In addition, the raceways should not have any prominences or depressions, i.e., no deviations from the ideal circular shape.

The invention further provides that the rotatable mounting of the rotor blades on the rotor hub be effected with the use of respective slewing bearings having one, two or more rows of rolling elements, each of which is subjected to the lowest possible Hertz pressure, and which can last longer to the extent that the formula of the patent is adhered to in the rest of the dimensioning. It is also particularly important in this connection that the diameters of the rolling elements transmitting the axial forces and the tilting moments be no less than 15 mm.

The invention additionally recommends that the rotatable mounting of the rotor blades on the rotor hub be effected with the use of respective slewing bearings having more than one row of rolling elements, different rows of rolling elements being used to transmit axial pressure forces, axial tensile forces and radial forces, respectively. In this case, it is advisable that one row of rolling elements for transmitting radial forces be disposed in the axial direction between two preferably identical rows of rolling elements serving to transmit axial pressure forces, on the one hand, axial tensile forces, on the other hand, and also tilting moments (a combination of tensile and pressure forces in different, preferably diametrically oppositely disposed regions on the periphery of the bearing). The axial load-bearing capacity in the tensile and pressure directions is thereby approximately the same. It should also be taken into account in such cases that a connecting element embracing the outer two rows of rolling elements should be implemented as split, specifically in a region between the middle row of rolling elements and one of the two outer rows of rolling elements, i.e., in a location displaced from the middle row of rolling elements in the axial direction to an end face of the bearing, preferably to the nearer end face, such that the middle row of rolling elements, absorbing the radial forces, comes into contact with only one of the two subrings of the embracing connecting element, this preferably applying specifically to the entire surface area of the rolling elements, i.e., in the case of roller-shaped rolling elements, both to their jacket surfaces and to their end faces.

Care should also be taken that the rotatable mounting of the rotor blades on the rotor hub is effected with the use of respective slewing bearings whose axial load-bearing capacity (in the pressure and/or tensile direction and in the case of tilting moments) is greater than their radial load rating. This has been found to meet the requirement specifications for a rotor blade bearing, since axial loads and tilting moment loads sharply outweigh radial loads in that application.

Furthermore, two rolling elements that are adjacent in the circumferential direction should be separated from each other by spacer element elements, or held even distances apart by cage elements, for example by cage elements having a curved base surface and extending in or along a cylindrical jacket surface. The fact that the balls need not travel along the raceway also prevents premature wear.

The invention recommends that the rotatable mounting of the rotor blades on the rotor hub be effected with the use of respective slewing bearings comprising two annular, mutually concentric, oppositely rotatable elements, one for connection to the rotor hub and the other for connection to a rotor blade.

The invention can be developed further in that the radially outwardly disposed annular connecting element is connected to the rotor hub, whereas the radially inwardly disposed annular connecting element is connected to the rotor blade, such that the rolling elements are disposed radially outside the circle of holes for threaded fasteners making the connection to the rotor blade.

Other advantages can be achieved by mutually offsetting those end faces of the two connecting elements which face in the same axial direction, thus preventing the ring connected to the rotor blade from scraping along the rotor hub.

A fully circumferential, slot-shaped clearance that remains between the two connecting elements should be sealed on both end faces of the slewing bearing and filled with a lubricant, particularly lubricating grease. Grease has the advantage over oil that it is easier to pack. Grease is more readily made to penetrate consistently between the rolling elements and their raceway.

Furthermore, a stiffening element, for example a stiffening ring, can be connected or connectable to one or both annular connecting elements, preferably in a force-locking or form-fitting manner, for example formed on or screwed on, or clamped in in a friction-locking manner. Such a stiffening ring can lie flat against an end face, particularly a connecting surface. It need not be rotationally symmetrical, but can be adapted to the preferred distribution of forces on a rotor blade during impingement by flow, for example by imparting an elliptical or oval shape to the cross section and/or the base area. Such a stiffening ring can also have through-holes to reduce its weight. The asymmetry can also be implemented in such a way that differences in the flexibility of the connecting structure can be corrected by different thicknesses and/or contours.

The adjustment of the rotor blades to minimize the structural load and/or to damp vibrations can take place under a closed- and/or an open-loop control scheme, but preferably as a function of the signal from at least one sensor for an (interference) variable that constitutes or leads to a measure of the sway of the tower. The invention prefers the use of a superordinated closed-loop control circuit and the derivation therefrom of drive signals for the adjusting motors of the individual rotor blades, for example on the basis of stored formulas, tables, characteristic curves or the like. It is also possible, however, for each rotor blade to have its own closed-loop or open-loop control circuit. Such a control circuit could be subordinated to a superordinated open- or closed-loop control system, in order, for example, to convert the global set points (parameters) from a superimposed closed-loop control circuit for each rotor blade into mutually phase-shifted drive signals corresponding to an angle of rotation that is shifted according to the angular offset of the rotor blades, of 360°/b (b being the number of blades on the rotor). Usually there are three rotor blades, but there also can sometimes be two, or four or more. In such cases, the open- or closed-loop control system would output a drive signal which, regardless of circumstances, would contain substantial spectral components at two and/or three times, generally also b times, the frequency of the rotor rotation speed, i.e., the amplitude of at least one of these spectral components ($2 \cdot n \cdot 2\pi/60$ or $3 \cdot n \cdot 2\pi/60$ or $b \cdot n \cdot 2\pi/60$) is greater than the amplitude of each of the other spectral components.

At least one sensor located on, at or in the wind power installation is preferably used as an input signal for an open- or closed-loop control circuit for adjusting a rotor blade.

One option that may be contemplated for this purpose is, for example, a sensor disposed in the upper region of the tower of the wind power installation, to detect swaying movements of the nacelle. This purpose could be served by a laser emitting vertically upward and disposed in the center of the tower on the floor, together with light-sensitive elements under the nacelle, which capture the laser beam and can determine the instantaneous deflection of the nacelle on the basis of the displacement of the light spot registered. Another option, however, is to install at the top end of the tower a precision GPS sensor that is able to determine the position to within a few centimeters' accuracy (a so-called differential GPS, for example). Other types of sensors may also be contemplated, for example acceleration sensors or deformation sensors.

A different and/or additional input signal can be picked up by at least one position sensor or angle sensor coupled to the main shaft of the rotor, to detect the absolute and/or relative rotational position of the rotor. In this way the position of each rotor blade can be determined in order to determine from it the effect of the blade on the disturbances and/or the potential counteractive force of the blade. In this connection, it must be kept in mind that due to the rotational movement of the rotor blade, the wind force acting on the blade causes a gyroscopic force oriented roughly perpendicular to the blade, and thus constantly changes direction in dependence on the particular position of the blade. A counterforce that an open- or closed-loop control circuit considers necessary will be distributed differently on the individual rotor blades at each instant.

The signal from at least one sensor that detects wind velocity and/or wind direction and is preferably disposed in the upper region of the tower of the wind power installation can also be used as an input variable of an open-loop control scheme according to the invention, specifically in the manner of a feedforward control scheme, since a signal of this kind can be used to determine or estimate expected values for asymmetrical loads on the rotor, along with all the rotors.

However, the signal from at least one sensor that is not located on, at or in the wind power installation, but is displaced therefrom, for example on, at or in an adjacent wind power installation, is also suitable for minimizing the structural load and/or for damping vibrations. In particular, if such sensors are installed upwind of the wind power installation to be damped, they supply this information with regard to future changes in wind velocity that have already occurred at the site of the sensor and have already been registered by the sensor there. Sensors for changes in air movements, for example infrared or laser sensors, are also suitable for this purpose.

A method according to the invention for designing a rotor blade bearing for a wind power installation with a plurality of rotor blades that are mutually independently adjustable and can be adjusted to minimize the structural load and/or to damp vibrations even when a constant wind velocity $v_\infty$ does not warrant it is characterized by the fact that used as a rotor blade bearing is a rolling bearing that is optimized for a high number of inner race revolutions in that its axial load rating according to DIN ISO 281 is at least 1.5 times the axial load rating according to DIN ISO 281 of a ball slewing bearing of comparable dimensions, and/or in that its life calculated according to DIN ISO 281 is at least four times the life, calculated according to DIN ISO 281, of such a ball slewing bearing.

In this context, the term "design of a rotor blade bearing" should be understand as a collective term not only for the conceptual design of such an installation, but also for the actual execution of such an installation.

Other features, characteristics, advantages and effects based on the invention will become apparent from the following description of preferred embodiment of the invention and by reference to the drawing. Therein:

Figure 1:
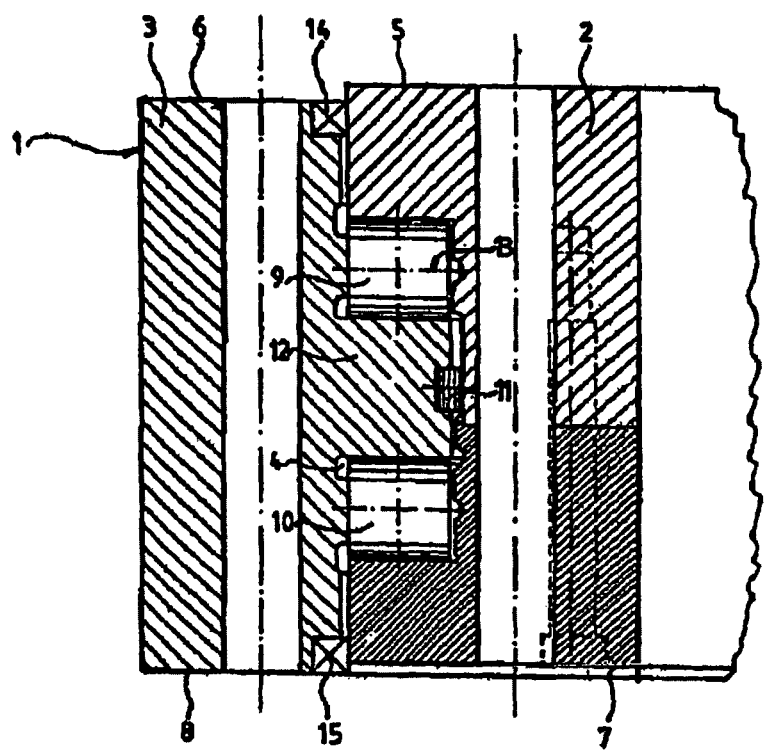
FIG. 1 shows a bearing, designed according to the principles of the invention, for the rotor blade of a wind power installation.

One important component for the inventive concept is a rotor blade bearing 1 designed for a high number of inner race revolutions. It is composed of two connecting elements 2, 3 in the form of mutually concentric rings. Both rings 2, 3 have annularly distributed boreholes 4, 5 for the passage of screws, bolts or the like, which are anchored to, i.e., screwed into, a rotor blade, on the one hand, and the rotor hub on the other.

The inner ring 2 is preferably connected to the rotor blade and the outer ring 3 to the rotor hub. Between the two annular connecting elements 2, 3 is a slot 4. The two annular connecting elements 2, 3 are preferably made of tempered steel, i.e., they are annealed and thermally treated.

In particular, the upper end faces 5, 6 of the two annular connecting elements 2, 3 do not lie in a common plane, but are offset from each other by, for example, 5 to 15 mm. The same is preferably true of the lower end faces 7, 8 of the two annular connecting elements 2, 3. The elevated end face 5, 8 in each case is screwed to the adjacent part of the wind power installation, i.e. the rotor blade or the rotor hub. Since the recessed end face 6, 7 of the respective other ring 2, 3, is set back a few millimeters, it cannot scrape along the part of the installation to which it is not connected.

The illustrated rotor blade bearing 1 exemplarily comprises rollers 9, 10, 11 as its rolling elements, but this is not mandatory. In the illustrated example there are, in all, three rows of roller-shaped rolling elements 9, 10, 11. These run along three raceways, each disposed along a different side of a collar-shaped, protruding extension 12 of approximately rectangular cross section, provided on the inner face of one annular connecting element 3, i.e., the face nearer the slot 4. The mutually facing raceways are disposed on respective ones of the three sides of a recess, also of approximately rectangular cross section, formed into the opposite ring. The raceways are surface-hardened, either by induction hardening or by flame hardening, specifically to a depth of at least $\frac{1}{20}^{th}$ of the roller diameter concerned.

The rollers 9, 10 above and below the collar 12 have axes of rotation 13 that extend radially to the axis of rotation of the bearing 1, whereas the third row of rollers 11, on the jacket surface of the collar 12, has axes of rotation that are parallel to the axis of rotation of the bearing 1. These rollers 11 have smaller diameters than rollers 9, 10, for example only half their diameter or less, preferably only one-third the diameter of rollers 9, 10 or less, particularly only one-fourth the diameter of rollers 9, 10 or less, such that the axial (static) load-bearing capacity of the bearing 1 is greater than the radial (statically) transmissible force. The rollers 9, 10 above and below the collar each have a diameter of 15 mm or more.

To facilitate assembly, the connecting element 2 disposed opposite the connecting element 3 with the formed-on collar 12 is split along a central plane.

The slot 4 is sealed by at least one respective gasket 14, 15 in the region between the two upper end faces 5, 6 and in the region between the two lower end faces 7, 8, and is filled with a lubricant, particularly lubricating grease. The slot 4 is preferably completely filled with grease, which may even be pressed in under elevated pressure to ensure an optimal lubricating film between the rolling elements 9-11, on the one hand, and the raceways, on the other. The seals 14, 15 are preferably configured such that their sealing lips are pressed firmly against the respective opposite connecting element 2, 3 by an internal overpressure in the slot 4.

As a result of the choice of materials and the tempering of the raceways, as well as calibration of the cross-sectional area $F_\alpha$ of each of the annular connecting elements 2, 3 (corrected for openings) to the number and dimensions of the rolling elements, the load rating of a bearing 1 configured in this way can be increased over that of conventional bearings without any notable increase in weight, making it fit for the desired purpose of use as a rotor blade bearing.

Figure 6:
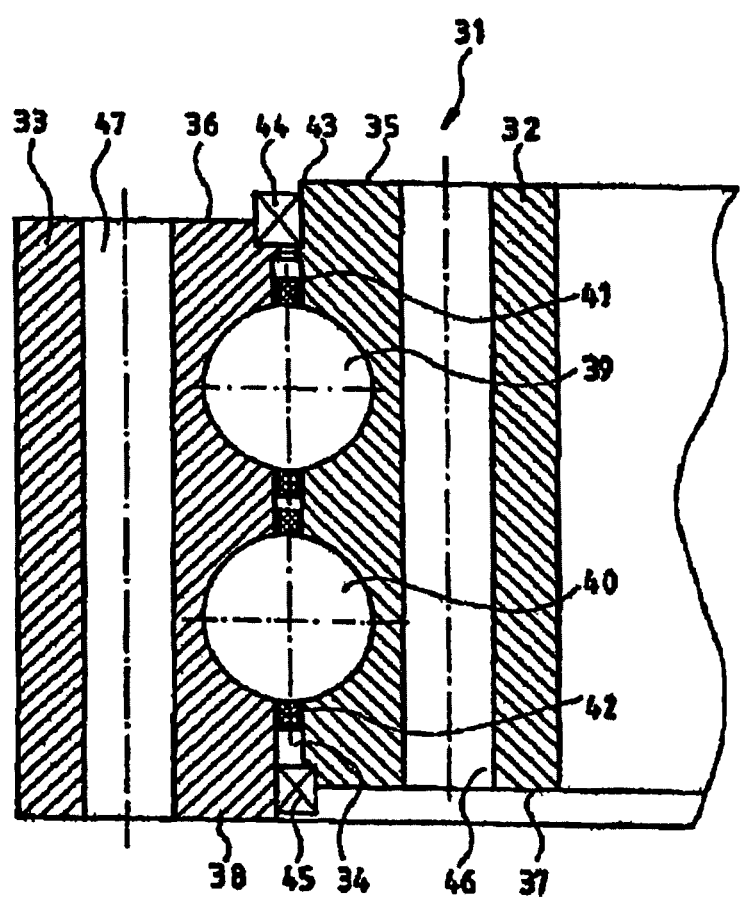
FIG. 6 shows a double-row ball slewing bearing that has a four-point raceway geometry in two raceways, the type of bearing typically used as a rotor blade bearing heretofore in the prior art, and which can be used as a reference bearing for comparison calculations.

A conventional rotor blade bearing 31 is illustrated in FIG. 6 for purposes of comparison. It will be noted that it is configured as a double-row ball slewing bearing, with two annular, mutually concentric connecting elements 32, 33 having a slot 34 between them. The two upper end faces 35, 36 may be offset slightly in relation to each other; the bottom two end faces 37, 38 are also mutually offset slightly and in the same direction, with the result that the two annular connecting elements 32, 33 have identical or nearly identical axial heights.

In the slot 34 between the two connecting elements 32, 33 there are two rows of spherically shaped rolling elements 39, 40 of identical diameter. These are maintained at equidistant spatial intervals by cages 41, 42.

A respective seal 44, 45 is provided in the region of each of the two mouths 43 of the slot 34.

If one mentally fills in the space occupied by the slot 43, the connecting bores 46, 47 and any other openings in the bearing cross section, such that the edges of the openings are sealed as smoothly as possible, the result is an areal cross section whose square measure can be denoted $F_Q$. Since the annular connecting elements 32, 33 each have the same height h, the measure $F_Q$ can be obtained in quite good approximation by multiplying that height h by the difference between the outer radius $r_o$ of the outer ring 33 minus the inner radius $r_i$ of the inner ring 32:

$$F_Q = (r_o - r_i) \cdot h.$$

Since the two rings 32, 33 have approximately the same radial thickness, the diameter $D_{pw}$ of the circular line passing through the centers of all the rolling elements 39, 40 is also, with good approximation:

$$D_{pw} = r_o + r_i = 2 \cdot R_{F,SP}.$$

Finally, it can be read from FIG. 6 that the diameter $D_W$ of a spherical rolling element 39, 40 is equal to approximately 3/10 the root of the areal cross section:

$$D_w = 0.3 \cdot F_Q^{0.5}.$$

According to DIN ISO 281, page 9, Item 6.1.1, Item 6.1.2 and Table 4, in the case of a single-row, four-point ball bearing, for $D_w$ (the ball diameter in millimeters)>25.4 mm and α (the nominal contact angle of a bearing in angular degrees) RFS 90°:

$$C_a = 3.647 \cdot b_m \cdot f_c \cdot (\cos \alpha)^{0.7} \cdot \tan \alpha \cdot Z^{2/3} \cdot D_w^{1.4},$$

where
$C_a$=dynamic axial load rating in newtons;
$b_m$=1.3 (load rating coefficient, depending on bearing type and bearing execution, for bearings of the standard quality of manufacture and employing the material currently in common use);
$f_c$=a factor dependent on the geometry, the precision of production and the material of the bearing parts;
Z=the number of balls transmitting loads in the same direction.

For a single-row, four-point ball bearing with $D_W$ (ball diameter in millimeters)≤25.4 mm, however, and α (the nominal contact angle of a bearing in angular degrees) RFS 90°, the DIN standard would dictate:

$$C_a = b_m \cdot f_c \cdot (\cos \alpha)^{0.7} \cdot \tan \alpha \cdot Z^{2/3} \cdot D_w^{1.8}.$$

This is virtually never the case with rotor blade bearings for high-power wind power installations. The formula of the patent nevertheless covers this case, since the two functions are unified by the d function.

According to the DIN standard, in the case considered here, $b_m$=1.3.

It must also be kept in mind that with rotor blade bearings for large wind power installations having a pitch circle diameter of 1,500 mm or above, the term $$x = (D_w \cdot \cos \alpha)/D_{pw}$$

typically assumes values of 0.01 to 0.03, since for $D_W$=40 mm, a=45° and $D_{pw}$≥1,500 mm, one obtains, for example, 0.019, a value that changes very little, because of a correlation between $D_w$ and $D_{pw}$. It is therefore possible, for the purposes of the present invention, to state an interpolation formula for $f_c$ that yields the intermediate values between 0.01 and 0.03 in the range $x = (D_w \cdot \cos \alpha)/D_{pw}$, said formula being:

$$f_c = -15{,}500 \cdot x^2 + 1.425 \cdot x + 29.4$$

As can easily be verified, this formula yields the following values:

$$x = 0.01 \rightarrow f_c = 42.1$$

$$x = 0.02 \rightarrow f_c = 51.7$$

$$x = 0.03 \rightarrow f_c = 58.2,$$

that is, precisely the values for $f_c$ given in Table 4 of DIN 281 for α=45°.

With the above stipulations concerning the reference ball bearing, for example $D_w$ $0.3 \cdot F_Q^{0.5}$ and $D_{pw} = 2 \cdot R_{F,SP}$, x can be simplified to:

$$x = 0.3 \cdot F_Q^{0.5} \cdot 0.7 / 2 \cdot R_{F,SP}$$

$$= 0.105 \cdot F_Q^{0.5} / R_{F,SP}.$$

$f_c$ thus becomes:

$$f_c = -170.89 \cdot F_Q / R_{F,SP}^2 + 149.63 \cdot F_Q^{0.5} / R_{F,SP} + 29.4$$

Finally, it must be taken into account that under DIN 281, the load ratings of plural rows of rolling bearings may not be simply added together. Rather, for axial bearings with two or more rows of balls, the (overall) dynamic load rating is:

$$C_{a,total,ref} = (Z_1 + Z_2 + \ldots + Z_n) \cdot [(Z_1/C_{a1})^{10/3} + (Z_2/C_{a2})^{10/3} + \ldots + (Z_n/C_{an})^{10/3}]^{-3/10},$$

where the load ratings $C_{a1}, C_{a2} \ldots C_{an}$ for the rows with $Z_1$, $Z_2, \ldots Z_n$ balls are calculated according to the above equation for single-row ball bearings.

Since the ball bearing of FIG. 6 has two identical rows of ball bearings, and thus $Z_1 = Z_2 = Z$ and $C_{a1} = C_{a2} = Ca$, these complex formulas can be reduced to:

$$C_{a,ref} = C_{a,total,ref} = 2^{7/10} \, C_a.$$

Taken altogether, then, after a few conversions (in which t=1.2 can be assumed for the reference bearing), $C_{a,ref}$ becomes:

$$C_{a,ref} = 2^{7/10} \cdot 3.647^\delta \cdot 1.3 \cdot [-170.89 \cdot F_Q / R_{F,SP}^2 + 149.63 \cdot F_Q^{0.5} /$$

$$R_{F,SP} + 29.4] \cdot 0.7846 \cdot (5.55 \cdot R_{F,SP} \cdot F_Q^{-1/2})^{2/3} \cdot [0.3 \cdot F_Q^{0.5}]^{(1.8-0.4 \cdot \delta)}$$

$$= 5.138 \cdot 3.647^\delta \cdot [0.3 \cdot F_Q^{0.5}]^{(1.6 - 0.4 \cdot \delta)} \cdot (R_{F,SP}^2 / F_Q)^{1/3} \cdot$$

$$[-170.89 \cdot F_Q / R_{F,SP}^2 + 149.63 \cdot (F_Q / R_{F,SP}^2)^{0.5} + 29.4]$$

This value depends only on $F_Q$, $R_{F,SP}$ and δ and thus can easily be calculated by the skilled person to check the suitability of a particular bearing as a rotor blade bearing for a high-power wind power installation with constant adjustment of the rotor blade angle, it being stipulated that the above value for $C_{a,ref}$ should be exceeded by a factor of at least 1.5.

In a typical configuration of a rotor blade bearing for a wind power installation with a rated power of approximately 3 MW as a double-row ball bearing, for example a dynamic load rating $C_{a,ref}=2,031$ kN would thus be obtained as a reference value; since this value would then have to be exceeded by a factor of at least 1.5, a suitable bearing would have to have a value $C_{a,total}$ of at least 3,046.5 kN.

This value can be attained by the skilled person in a number of ways.

For example, the skilled person could increase the number of balls and/or change the ball radius, insofar as this does not affect the stability of the bearing, or he could replace one or more rows of balls with other rolling elements; the geometrical arrangement of the individual rows of balls and/or rows of other rolling elements are also subject to no restrictions.

Should the skilled person opt to use one or more rows of rollers as rolling bearings, then, according to DIN ISO 281, page 12, Item 8.1.1.1, Table 9 and page 13, Table 10, given a roller bearing with. $\alpha=90°$, he can calculate the dynamic axial load rating $C_a$ of the particular row of rollers as follows:

$$C_a = b_m \cdot f_c \cdot L_{wo}^{7/9} Z^{3/4} \cdot D_{wo}^{28/27},$$

where $L_{wo}$=the roller length, in millimeters, to be used in the load rating calculation;

$D_{wo}$=the roller diameter, in millimeters, to be used in the load rating calculation;

Z=the number of rollers.

In the case of axial bearings with two or more rows of rollers, the (overall) dynamic load rating is:

$$C_a = (Z_1 \cdot L_{wo1} + \ldots + Z_n \cdot L_{wen}) \cdot \{[(Z_1 \cdot L_{we1})/C_{a1}]^{9/2} + \ldots + [(Z_n \cdot L_{wen})/C_{an}]^{9/2}\}^{-2/9},$$

the load ratings $C_{a1}$, $C_{a2}$ ... $C_{an}$ for the rows having $Z_1$, $Z_2$ ... $Z_n$ rollers being calculated according to the above equation for single-row roller bearings.

It can be seen from the foregoing that the load rating depends quite decisively on the variables roller length, roller diameter and number of rollers, so these variables, in turn, must be determined according to the above reference formula in order to actually arrive at a bearing that is suitable for use as a rotor blade bearing.

In a design according to the invention of a rotor blade bearing 1 for a wind power installation with a rated power of approximately 3 MW as a three-row roller bearing, it being the case here that for purposes of simplification only the axial load-bearing capacity, and thus only the axial-load-bearing rows of roller elements, are considered, axial dynamic load ratings $C_{arollerbearing}$ of more than 4,000 kN can be achieved, and the formula of the patent is therefore satisfied.

The rated life $L_{10}$ of an axial ball bearing is expressed as follows according to DIN ISO 281, page 11, Item 6.3.1:

$$L_{10,ref} = (C_{a,ref}/P_a)^3,$$

where $P_a$=the dynamic equivalent axial load in newtons.

The rated life $L_{10}$ of a simple axial roller bearing is expressed as follows according to DIN ISO 281, page 14, Item 8.3.1:

$$L_{10} = (C_{a,total}/P_a)^{10/3}.$$

Setting, by way of approximation, $10/3=3.333 \approx 3$, and further assuming—as is normally the case—that the $P_a$ value of the axial rolling bearing is the same as that of a double-row ball slewing bearing with $\alpha=45°$, it follows, for the life equation $V_L = L_{10}/L_{10,ref}$ that:

$$V_L = (C_{a,total}/C_{a,ref})^3.$$

Since according to the invention $C_{a,total} \geq 1.5 \cdot C_{a,ref}$, the following applies to a bearing calculated according to the invention:

$$V_L \geq (1.5)^3 = 3.375,$$

that is, the life that can be expected is at least more than three times that of a conventional rotor blade bearing; it increases rapidly with a slight increase in $C_{a,total}$, and can easily reach values more than ten times those of a conventional rotor blade bearing.

Since the number of inner race revolutions of the rotor blade bearing 1 used is thereby increased in proportion to $V_L$, novel open- and/or closed-loop control schemes can be devised in order to reduce, or even minimize, structural loads on the tower of a so-equipped wind power installation.

Figures 2A, 2B, 2C:
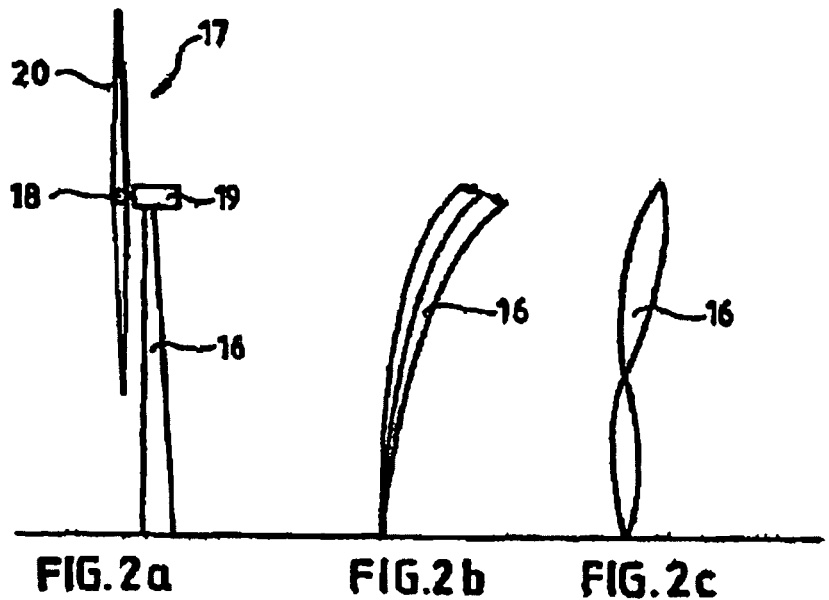
FIGS. 2-5 show various loading cases that are applicable to a wind power installation having rotor blade bearings according to the invention and can be minimized by means of the invention.

As can be understood from FIG. 2, the tower 16 of a wind power installation 17 is not completely rigid, but can be excited—by wind gusts, for example—to swaying movements (see FIG. 2b) and/or to vibrations or deflections (see FIG. 2c). For example, swaying movements are excited by varying wind pressure on the rotor 18, and are transmitted from there to the nacelle 19; vibrations or deflections are triggered, for example, by a bending moment acting on the rotor. These swaying movements and/or vibrations can be measured and thus detected by one or more position sensors in and/or at the tower 16.

As a countermeasure, the pitch of one, more than one or all of the rotor blades 20 can be adjusted in such a way that, through interaction with the wind, they bring altered wind forces to bear on the rotor 18 and thus on the nacelle 19, in order to counteract the swaying movements and/or vibrations.

The particular angle of rotation of the rotor blade about the rotor axis or main axis is also preferably taken into account here; for this purpose, a position sensor or angle sensor should also be placed on the rotor shaft or main shaft so that the angular positions of all the rotor blades are known at each instant.

Figure 3:
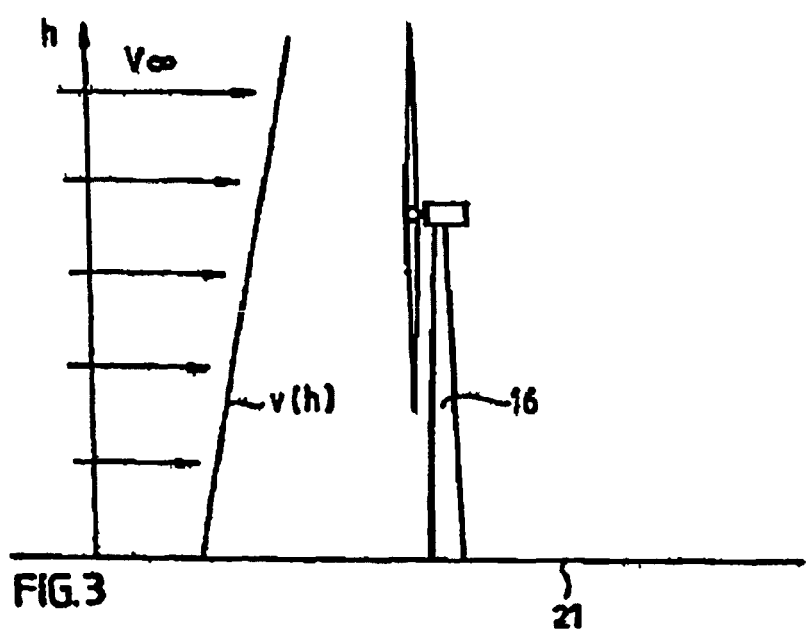

In addition to such a closed-loop control scheme, there are also various open-loop control principles that can be used to minimize structural loads on the tower 16 of the wind power installation 17, even, if need be, without knowledge of the particular sway amplitude and/or vibration amplitude(s):

As FIG. 3 shows, normally the wind velocity v is not everywhere constant, but is a function v(h) of the height h above the ground 21 and increases with increasing height h, say to a maximum of $v_\infty$ at high altitude. A rotor blade 20 therefore experiences a stronger wind force at the apex of its circular motion about the main axis of the rotor 18 than it does at the nadir of its path. The swaying movements and/or vibrations induced in the tower 16 in this way can be determined empirically and stored as a formula, characteristic curve or table as a function of the high-altitude wind velocity $v_\infty$, making it possible to adjust the pitch of the rotor blades 20 periodically, in accordance with their period of revolution, to minimize the associated wind force fluctuations. The particular instantaneous high-altitude wind velocity $v_\infty$ is determined, for example, by means of a wind force sensor preferably located at the top of the nacelle 19 of the wind power installation 17.

Figure 4:
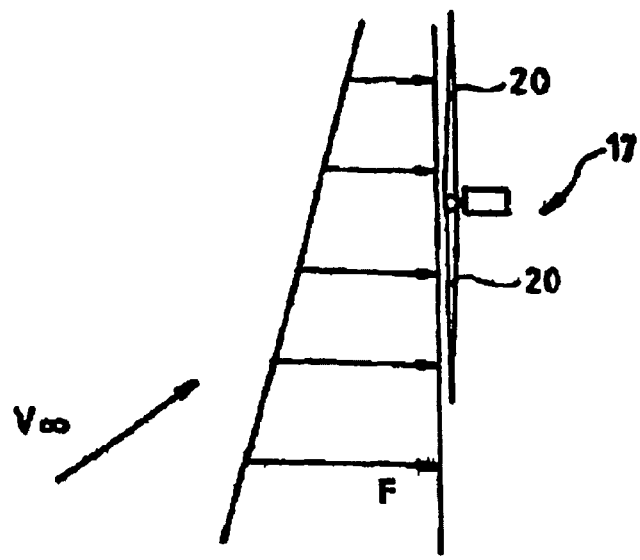
Figure 5:
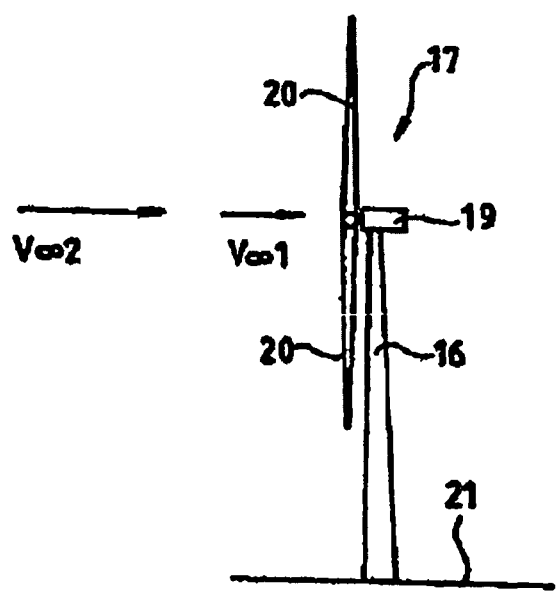

By the same token, the tower 16 of a wind power installation 17 can also be excited to rotational or torsional vibrations about its vertical axis. This happens primarily when the wind is not blowing steadily from the same direction, but is instead rotating more or less rapidly, as indicated in FIG. 4, which is a plan view of a wind power installation 17. In that illustration, the wind—because it is gusting, for example—rotates for a moment and no longer strikes the plane of the rotor blade perpendicularly, and thus is longer parallel to the direction of the main axis of the rotor. The effect is that the wind force experienced by a rotor blade 20 depends not only on the height of the blade, but also on its orientation with respect to the changed wind direction. If a rotor blade 20 is pointing directly into the direction of the wind $v_\infty$, like the rotor blade 20 depicted at the bottom in FIG. 4, then it has a higher wind attack area and therefore experiences a greater wind force F than an approximately oppositely disposed rotor blade 20, which, by contrast, is partially shielded, for example by the rotor hub 18 of the wind power installation 17.

Such torsional vibrations of the tower 16 can also be counteracted by suitable (anticyclic) open-loop control of the pitch of the rotor blades 20. The particular instantaneous wind direction is determined, for example, by means of a sensor for the wind direction, preferably located at the top of the nacelle 19 of the wind power installation 17. The open- and/or closed-loop control scheme according to the invention takes advantage of the fact, here, that the drag torque of a rotor blade 20 that must be overcome in adjusting the pitch of the blade is much lower than, for example, the drag torque of the unit comprised of the nacelle 19 and the rotor 18, plus the rotor blades 20, that must be overcome to move the nacelle 19 in another wind direction.

FIG. 4 illustrates yet another case, that of a squally wind that varies in strength rather than direction, for example from $v_{-1}$ to $v_{-2}$. This can be detected, for example, by means of sensors that are disposed, not right at the wind power installation 17, but in its vicinity: in the case of wind parks, for example, on adjacent wind power installations 17, masts, buildings, etc. To the extent that these wind power installations 17 are interconnected in a grid, even before a squall hits, the wind power installation 17 under consideration can learn of this event and adjust the pitch of the rotor blades 20 in such a way that when the squall does hit, they attenuate or even compensate for the sudden increase in wind force F normally associated with it, and thus keep this increased wind force wholly or partially away from the tower 16 of the wind power installation 17.

As can be seen, numerous structural loads can be kept away from the tower 16 of the wind power installation by the inventive design of the rotor blade bearing 1, with the result that the tower sways and vibrates much less than it would without such a measure. The operating life of a wind power installation 17 can be considerably increased by this means.

The invention claimed is:

1. A wind energy installation (17) whose rated electrical power $P_{W,rated}$ is at least 1.5 MW comprising a rotor whose rotor diameter is at least 70 m, and/or which has at least one rotor blade bearing with a pitch diameter $D_{pw}$ of at least 1,500 mm, wherein the rotor blade bearing is configured as a rolling slewing bearing comprising two annular, mutually concentric, oppositely rotatable elements for connection to a rotor hub, on the one hand, and for connection to a rotor blade, on the other hand, wherein provided between the two connecting elements is a fully circumferential, slot-shaped clearance that is sealed on both end faces of said bearing and is filled with a lubricant, with a surface area $F_Q$ of the entire bearing-ring cross-section, without voids, and with a radius $R_{F,SP}$ of the centroid of the cross-sectional area, with a volume $V=F_Q*2*\pi*R_{F,SP}$, calculated from the surface area $F_Q$ of the entire bearing-ring cross-section, without voids, multiplied with the perimeter $2*\pi*R_{F,SP}$ at the centroid of the cross-sectional area, and with a total dynamic axial load rating $C_{a,total}$, defined according to DIN ISO 281, of all rows (μ) of rolling elements (9, 10), which participate in a force transmission in an axial direction, and wherein provided for adjusting said rotor blade is at least one open-loop and/or closed-loop control system, which, to minimize the static or dynamic structural load and/or to damp vibrations and/or to compensate for interference forces and moments, as by generating counterforces, adjusts said rotor blades even when a constant wind velocity $v_\infty$ does not warrant it, characterized in that in the context of said rotor blade rolling bearings, a) for those rows of rolling elements which participate at the force transfer in axial direction, surface-hardened raceways without any prominences or depressions are provided, b) and wherein the thickness $d_H$ of the surface-hardened raceway layer is equal to at least $\frac{1}{20}^{th}$ of the particular rolling element diameter $D_W$: $d_H > 0.05*D_W$, so that c) the total dynamic axial load rating $C_{a,total}$, defined according to DIN ISO 281, of all rows (μ) of a utilized rolling bearing (1) according to DIN ISO 281, which participate in force transmission in an axial direction, matches the following relationship:

$$C_{a,ges} > 2.9277*[-170.89*F_Q*R_{F,SP}^{-4/3} + 149.63*F_Q^{0.5}*R_{F,SP}^{-1/3} + 29.4*R_{F,SP}^{2/3}]*F_Q^{17/30},$$

if $F_Q < 71.6844$ cm²; and $$C_{a,ges} > 6.5966*[-170.89*F_Q*R_{F,SP}^{-4/3} + 149.63*F_Q^{0.5}*R_{F,SP}^{-1/3} + 29.4*R_{F,SP}^{2/3}]*F_Q^{11/30},$$

if $F_Q > 71.6844$ cm²;

d) and wherein, for minimizing the structural load and/or for damping of vibrations, there is provided an open- or closed-loop control system for adjusting said rotor blades, which uses as an input variable a signal from at least one sensor disposed on, at or in said wind power installation, namely the signal of at least one position or angle sensor coupled to a main shaft of the rotor, and the signal of at least one sensor for a wind velocity disposed in an upper region of a tower of the wind power installation, e) and wherein there is provided an interconnection between the wind power installation and adjacent wind power installations, so that the wind power installation can learn via sensors, which are not disposed on, at or in said wind power installation, but at adjacent wind power installations, from a squall even before the latter hits, to adjust the pitch of the rotor blades in such a way that when the squall does hit, the wind force is wholly or partially kept away from the tower of the wind power installation.

2. The wind energy installation as in claim 1, characterized in that the two connecting elements of at least one rotor blade bearing are each made of a tempered and annealed steel that has been thermally treated.

3. The wind energy installation as in claim 1, characterized in that the end faces of the two connecting elements face in the same axial direction and are mutually offset.

4. The wind energy installation as in claim 1, characterized in that the radially outwardly disposed annular connecting element is connected to the rotor hub, whereas the radially inwardly disposed annular connecting element is connected to the rotor blade.

5. The wind energy installation as in claim 1, characterized in that said surface-hardened raceways are induction-hardened or flame-hardened.

6. The wind energy installation as in claim 1, characterized in that the thickness $d_H$ of the surface-hardened raceway layer is equal to at least $\frac{1}{25}^{th}$ of the particular rolling element diameter $D_w$, that is:

$$d_H 0.04 \cdot D_w.$$

7. The wind energy installation as in claim 1, characterized in that the rotor blade bearing is configured so as to not have a spherical shape.

8. The wind energy installation as in claim 1, characterized in that the rolling elements of at least one row form linear areas of contact with their respective raceways.

9. The wind energy installation as in claim 1, characterized in that rolling elements of at least two rows form linear areas of contact with their respective raceways.

10. The wind energy installation as in claim 9, characterized in that two rolling elements of at least one rotor blade bearing that are adjacent in the circumferential direction are separated from each other by spacer elements or are separated from each other by cage elements extending in or along a cylindrical jacket surface.

11. The wind energy installation as in claim 9, characterized in that at least one rotor blade bearing is configured as a slewing bearing whose axial load-bearing capacity $F_a$ is greater than its radial load-bearing capacity $F_r$:

$$F_a > F_r,$$

particularly by a factor of at least 1.25:

$$F_a/F_r > 1.25.$$

12. The wind energy installation as in claim 9, characterized in that at least one rotor blade bearing is configured as a slewing bearing with more than one row of rolling elements, wherein different rows of the rolling elements serve to transmit axial forces and radial forces, respectively.

13. The wind energy installation as in claim 1, characterized by the open-loop and/or closed-loop control system adjusting said rotor blades to minimize the structural load and/or damp vibrations and/or generate counterforces or countertorques.

14. The wind energy installation as in claim 13, wherein the open-loop and/or closed-loop control system for adjusting said rotor blades is adapted to receive input from a wind sensor removed from the control system.

15. The wind energy installation as in claim 14, wherein said sensor is coupled, for transmission of its output signal to the control system for adjusting said rotor blades to minimize the structural load and/or to damp vibrations comprises a wind velocity and/or direction sensor.

16. The wind energy installation as in claim 14, characterized in that said wind energy installation is coupled to an information network that provides wind forecasts for a local region.

17. A wind energy installation whose rated electrical power $P_{W,rated}$ is at least 1.5 MW comprising a rotor whose rotor diameter is at least 70 m, and/or which has at least one rotor blade bearing with a pitch diameter $D_{pw}$ of at least 1,500 mm, wherein the rotor blade bearing is configured as a rolling slewing bearing comprising two annular, mutually concentric, oppositely rotatable elements for connection to a rotor hub on the one hand, and for connection to a rotor blade on the other hand, wherein provided between the connecting elements is a fully circumferential, slot-shaped clearance that is sealed on both end faces of said bearing and is filled with a lubricant, with a surface area $F_Q$ of the entire bearing-ring cross-section, without voids, and with a radius $R_{F,SP}$ of the centroid of the cross-sectional area, with a volume $V = F_Q * 2 * \pi * R_{F,SP}$, calculated from the surface area $F_Q$ of the entire bearing-ring cross-section, without voids, multiplied with the perimeter $2 * \pi * R_{F,SP}$ at the centroid of the cross-sectional area, and with a total dynamic axial load rating $C_{a,total}$, defined according to DIN ISO 281, of all rows ($\mu$) of rolling elements, which participate in a force transmission in an axial direction, and wherein provided for adjusting said rotor blade is at least one open-loop and/or closed-loop control system, which, to minimize static or dynamic structural load and/or to damp vibrations and/or to compensate for interference forces and moments, as by generating counterforces, adjusts said rotor blade, even when a constant wind velocity $v_\infty$ does not warrant it, wherein in the context of said rotor bearings:

a) for those rows of rolling elements which participate at the force transfer in axial direction, surface-hardened raceways without any prominences or depressions are provided, b) and wherein the thickness $d_H$ of the surface-hardened raceway layer is equal to at least $\frac{1}{20}^{th}$ of the particular rolling element diameter $D_W$: $d_H > 0.05 * D_W$, so that c) the total dynamic axial load rating $C_{a,total}$, defined according to DIN ISO 281, of all rows ($\mu$) of a utilized rolling bearing according to DIN ISO 281, which participate in force transmission in an axial direction, matches the following relationship:

$$C_{a,ges} > 2.9277 * [-170.89 * F_Q * R_{F,SP}^{-4/3} + 149.63 * F_Q^{0.5} * R_{F,SP}^{-1/3} + 29.4 * R_{F,SP}^{2/3}] * F_Q^{17/30},$$

if $F_Q < 71.6844$ cm$^2$; and $$C_{a,ges} > 6.5966 * [-170.89 * F_Q * R_{F,SP}^{-4/3} + 149.63 * F_Q^{0.5} * R_{F,SP}^{-1/3} + 29.4 * R_{F,SP}^{2/3}] * F_Q^{11/30},$$

if $F_Q > 71.6844$ cm$^2$;

d) and wherein, for minimizing the structural load and/or for damping of vibrations, there is provided an open- or closed-loop control system for adjusting said rotor blades, which uses as an input variable a signal from at least one sensor disposed on, at or in, said wind power installation, namely the signal of at least one position or angle sensor coupled to a main shaft of the rotor, and the signal of at least one sensor for a wind velocity disposed in an upper region of a tower of the wind power installation, e) and wherein for each rotor blade, there is provided a subordinated closed-loop control scheme, so that the rotor blades can be mutually independently adjusted;

f) and wherein there is provided an interconnection between the wind power installation and adjacent wind power installations, so that the wind power installation can learn via sensors, which are not disposed on, at or in, said wind power installation, but at adjacent wind power installations, from a squall even before the latter hits, to adjust the pitch of the rotor blades in such a way that when the squall does hit, the wind force is wholly or partially kept away from the tower of the wind power installation.

18. A wind energy installation whose rated electrical power $P_{W,rated}$ is at least 1.5 MW comprising a rotor whose rotor diameter is at least 70 m, and/or which has at least one rotor blade bearing with a pitch diameter $D_{pw}$ of at least 1,500 mm, wherein the rotor blade bearing is configured as a rolling slewing bearing comprising two annular, mutually concentric, oppositely rotatable elements for connection to a rotor hub, on the one hand, and for connection to a rotor blade, on the other hand, wherein provided between the two connecting elements is a fully circumferential, slot-shaped clearance that is sealed on both end faces of said bearing and is filled with a lubricant, with a surface area $F_Q$ of the entire bearing-ring cross-section, without voids, and with a radius $R_{F,SP}$ of the centroid of the cross-sectional area, with a volume $V = F_Q * 2 * \pi * R_{F,SP}$, calculated from the surface area $F_Q$ of the entire bearing-ring cross-section, without voids, multiplied with the perimeter $2*\pi*R_{F,SP}$ at the centroid of the cross-sectional area, and with a total dynamic axial load rating $C_{a,total}$, defined according to DIN ISO 281, of all rows ($\mu$) of rolling elements, which participate in a force transmission in an axial direction, and wherein provided for adjusting said rotor blade is at least one open-loop and/or closed-loop control system, which, to minimize static or dynamic structural load and/or to damp vibrations and/or to compensate for interference forces and moments by generating counter-forces, adjusts said rotor blade, even when a constant wind velocity $v_\infty$ does not warrant it, characterized in that in the context of said rotor blade bearings,

- a) for those rows of rolling elements which participate at the force transfer in axial direction, surface-hardened raceways without any prominences or depressions are provided
- b) and wherein the thickness $d_H$ of the surface-hardened raceway layer is equal to at least $\frac{1}{20}^{th}$ of the particular rolling element diameter $D_W$: $d_H > 0.05*D_W$, so that
- c) the total dynamic axial load rating $C_{a,total}$, defined according to DIN ISO 281, of all rows ($\mu$) of a utilized rolling bearing according to DIN ISO 281 which participate in force transmission in an axial direction, is at least 1.5 times the dynamic axial load rating $C_{a,ref}$ according to DIN ISO 281 of a double-row ball slewing bearing of comparable overall dimensions, calculated from the area $F_Q$ of the bearing cross section, corrected for voids, times the circumference centered on the centroid, and having mutually identical balls in both rows and a support angle $\alpha$ of 45°:

$$C_{a,total} \geq k_1 \cdot C_{a,ref},$$

where $k_1$=at least 1.5, and wherein the dynamic axial load rating $C_{a,ref}$ of a reference double-row ball slewing bearing of comparable overall dimensions is determined as follows:

$$C_{a,ref} = 2^{7/10} \cdot C_{a\mu},$$

with:

$$C_{a\mu} = 3.647 \cdot b_m \cdot f_c \cdot (\cos \alpha)^{0.7} \cdot \tan \alpha \cdot Z^{2/3} \cdot D_w^{(1.8-0.4 \cdot \delta)}$$

and with:

$\delta$=0 for $D_w \leq 25.4$ mm, 1 for $D_w > 25.4$ mm;

where:

$C_{a\mu}$=axial load rating of a row of axial-load-bearing rolling elements, $b_m$=1.3, $f_c$=to be determined according to DIN 281, Z=number of rolling elements per row, $D_w$=diameter of a rolling element, and wherein said reference double-row ball slewing bearing of comparable overall dimensions satisfies the following conditions:

a) $Z = D_{pw}/(D_w \cdot t)$, where $t=1.2$;

b) $D_{pw} = 2 \cdot R_{F,SP}$;

c) $D_w = 0.3 \cdot F_Q^{0.5}$;

with:

$D_{pw}$=diameter of the circular line passing through the centers of the rolling elements of a row;

$R_{F,SP}$=radius of the centroids of the cross-sectional area;

$F_Q$=area of the total bearing-ring cross section, minus voids

- d) and wherein, for minimizing the structural load and/or for damping of vibrations, there is provided an open- or closed-loop control system for adjusting said rotor blades, which uses as an input variable a signal from at least one sensor disposed on, at or in said wind power installation, namely the signal of at least one position or angle sensor coupled to a main shaft of the rotor, and the signal of at least one sensor for a wind velocity disposed in an upper region of a tower of the wind power installation,
- e) and wherein there is provided an interconnection between the wind power installation and adjacent wind power installations, so that the wind power installation can learn via sensors, which are not disposed on, at or in said wind power installation, but at adjacent wind power installations, from a squall even before the latter hits, to adjust the pitch of the rotor blades in such a way that when the squall does hit, the wind force is wholly or partially kept away from the tower of the wind power installation.

* * * * *